United States Patent
Padget et al.

(10) Patent No.: US 10,174,934 B2
(45) Date of Patent: Jan. 8, 2019

(54) ROTARY POWER TOOL LIGHTING SYSTEM

(71) Applicants: Robert Bosch Tool Corporation, Broadview, IL (US); Robert Bosch GmbH, Stuttgart (DE)

(72) Inventors: Bradley D. Padget, Huntley, IL (US); Joseph S. Scaduto, Schaumburg, IL (US); Julio Camacho, Mexicali (MX); Jaime Moreno, Imperial, CA (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 227 days.

(21) Appl. No.: 14/964,838

(22) Filed: Dec. 10, 2015

(65) Prior Publication Data

US 2017/0167721 A1   Jun. 15, 2017

(51) Int. Cl.
| | |
|---|---|
| B25B 23/18 | (2006.01) |
| F21V 33/00 | (2006.01) |
| B25F 5/02 | (2006.01) |
| B25F 5/00 | (2006.01) |
| F21S 9/02 | (2006.01) |
| F21V 23/04 | (2006.01) |
| H02K 7/14 | (2006.01) |
| F21Y 101/02 | (2006.01) |
| F21Y 105/00 | (2016.01) |

(52) U.S. Cl.
CPC .......... *F21V 33/0084* (2013.01); *B25B 23/18* (2013.01); *B25F 5/00* (2013.01); *B25F 5/021* (2013.01); *F21S 9/02* (2013.01); *F21V 23/04* (2013.01); *H02K 7/145* (2013.01); *F21Y 2101/02* (2013.01); *F21Y 2105/003* (2013.01)

(58) Field of Classification Search
CPC ........ F21V 33/0084; B25B 23/18; F21S 9/02; H02K 7/145; B25F 5/00
USPC ........................................................ 362/119
See application file for complete search history.

(56) References Cited

U.S. PATENT DOCUMENTS

| | | |
|---|---|---|
| 4,642,738 A | 2/1987 | Meller |
| 5,797,670 A | 8/1998 | Snoke et al. |
| 6,713,905 B2 | 3/2004 | Hirschburger et al. |
| 7,185,998 B2 | 3/2007 | Oomori et al. |
| 7,200,516 B1 | 4/2007 | Cowley |
| 7,568,288 B2 | 8/2009 | Baker |
| 2004/0093749 A1 | 5/2004 | Wu |

(Continued)

FOREIGN PATENT DOCUMENTS

DE   102012224448 A1   7/2014

OTHER PUBLICATIONS

International Search Report corresponding to PCT Application No. PCT/EP2016/080176 (5 pages).

*Primary Examiner* — Evan Dzierzynski
(74) *Attorney, Agent, or Firm* — Maginot Moore & Beck LLP (57) ABSTRACT

A rotary power tool includes a tool housing and a lighting system. The tool housing has a main body portion and a nose portion, which includes a nose cap. The lighting system includes a lighting system housing mounted on the tool housing and defining a battery compartment, a light source, and at least one battery disposed in the battery compartment. The at least one battery is operably connected to the light source to supply electrical current to the light source.

16 Claims, 7 Drawing Sheets

(56) References Cited

U.S. PATENT DOCUMENTS

| | | | |
|---|---|---|---|
| 2005/0265033 A1* | 12/2005 | Yang | B25B 23/18 |
| | | | 362/398 |
| 2009/0256319 A1 | 10/2009 | Seymour et al. | |
| 2010/0053940 A1 | 3/2010 | Yaksich | |
| 2010/0134021 A1* | 6/2010 | Ayres | H05B 33/0854 |
| | | | 315/149 |
| 2011/0025207 A1 | 2/2011 | Nagasaka et al. | |
| 2011/0110734 A1* | 5/2011 | Scrimshaw | B23B 31/001 |
| | | | 408/16 |
| 2011/0188232 A1 | 8/2011 | Friedman et al. | |
| 2014/0036482 A1* | 2/2014 | Vanko | B25F 5/021 |
| | | | 362/119 |

* cited by examiner

ROTARY POWER TOOL LIGHTING SYSTEM

CROSS-REFERENCE TO RELATED APPLICATION

Cross-reference is made to copending U.S. patent application Ser. No. 29/548,057 entitled "Power Tool" by Markwald et al., filed on Dec. 10, 2015, the contents of which are hereby incorporated by reference in their entirety.

TECHNICAL FIELD

This disclosure relates generally to power tools, and more particularly to rotary power tools.

BACKGROUND

In general, rotary power tools are light-weight, handheld power tools capable of being equipped with a variety of accessory tools and attachments, such as cutting blades, sanding discs, grinding tools, and many others. These types of tools typically include a generally cylindrically-shaped main body that serves as an enclosure for an electric motor as well as a hand grip for the tool. The electric motor drives an output shaft to rotate at high speeds. The output shaft is equipped with an accessory attachment system that enables accessory tools to be releasably secured to the power tool.

Small rotary power tools can be used to perform many tasks, some of which may be at locations in which the ambient light is relatively low. One solution to this problem is to position a light at the nose end of the power tool. While many types of light producing devices can be used, solid-state light emitting diodes (LEDs) are preferred because they are not prone to being easily damaged and emit sufficient amounts of light to illuminate the work area without requiring a significant amount of power.

In some conventional rotary power tools, the light is directly connected to the tool power source via a wired connection within the power tool. For example, for battery powered rotary tools, the light is connected to the battery by a wired connection, while for A/C powered rotary tools, the light is connected to the mains power source via a wired connection within the tool. One problem with connecting the light source to the tool power source is that the wires result in the grip profile of the tool being enlarged at the portion through which the wires are run. This can result in reduced user comfort and may be less aesthetically pleasing.

In some other conventional rotary power tools, the lights are powered by means of an onboard generating system, which can include a magnet located on the output shaft or other rotating portion of the tool. The magnet produces a magnetic field as the tool is operated to rotate, and an inductive coil on the light or inductor generates a current that is used to illuminate the light.

Another solution to lighting the power tool is to provide a long pivotable or flexible arm having a one end attached to the power tool and the opposite end including a light. The long pivot or flexible arms, however, are cumbersome and can interfere with a user's ability to see the working area or to grip the tool.

It would therefore be desirable to provide a lighting system for a rotary tool that is compact, simple to manufacture, and does not interfere with the operator's use of the rotary tool.

SUMMARY

In one embodiment, a rotary power tool includes a tool housing and a lighting system. The tool housing comprises a main body portion and a nose portion, which includes a nose cap. The lighting system includes a lighting system housing mounted on the tool housing and defining a battery compartment, a light source, and at least one battery disposed in the battery compartment. The at least one battery is operably connected to the light source to supply electrical current to the light source.

In one embodiment of the rotary power tool, the light source is supported by the lighting system housing and the lighting system housing is rotatably supported on the tool housing so as to be rotatable around the nose cap.

In a further embodiment of the rotary power tool, the lighting system housing includes a mounting ring circumferentially surrounding a portion of the tool housing to mount the lighting system on the tool housing.

In yet another embodiment, the nose cap includes a first threaded region configured to mount the nose cap on a second threaded region of the main body portion. The mounting ring is arranged between the nose cap and the main body portion so that the nose cap clamps the mounting ring in a fixed position when the nose cap is tightened onto the main body portion.

In some embodiments of the rotary power tool, the mounting ring is rotatable around the nose cap when the nose cap is not tightened to the main body portion.

In one particular embodiment of the rotary power tool, the nose cap includes an outer surface and the lighting system housing includes a lower surface that is complementary to a portion of the outer surface. The lower surface is configured to slide along the outer surface.

In a further embodiment, the lighting system further comprises a light power switch operably connected to the light source and to the at least one battery. The light power switch is configured to open and close an electrical connection between the light source and the at least one battery.

In some embodiments, the lighting system housing is supported by and fixed to the nose cap.

In further embodiments of the rotary power tool, the nose cap includes a front cover defining an opening, and the light source is configured to emit light through the opening.

In some embodiments of the rotary power tool, the light source includes an LED light. In one particular embodiment, the light source includes an LED light ring arranged around at least a portion of a circumference of the nose cap.

In yet another embodiment, the rotary power tool further comprises a motor arranged in the main body portion of the housing. In some embodiments, the rotary power tool also includes a tool holder operably connected to an output shaft of the motor such that the output shaft of the motor rotationally drives the tool holder. The light source is configured to emit light in a direction toward the tool holder.

In some embodiments, the at least one battery includes a 12 volt battery.

In another embodiment according to the disclosure, a lighting system for a rotary power tool comprises a lighting system housing, a light source, and at least one battery. The lighting system housing includes a mounting ring configured to circumferentially surround a portion of a tool housing of the rotary power tool between a nose cap and a main body portion of the rotary power tool to rotatably mount the lighting system housing on the rotary power tool, the lighting system defining a battery compartment. The light source is supported by the lighting system housing, and the at least one battery is disposed in the battery compartment and is operably connected to the light source to supply electrical current to the light source.

In a further embodiment according to the disclosure, an accessory for a rotary power tool comprises an accessory housing, a light source, and at least one battery. The accessory housing is configured to attach to a tool housing of the rotary power tool, and the accessory housing defining a battery compartment. The at least one battery is arranged in the battery compartment, and the at least one battery being operably connected to the light source to supply electrical current to the light source.

In a further embodiment, the accessory includes a nose cap configured to connect to the rotary power tool and the nose cap supports the light source.

In another embodiment of the accessory, the accessory housing includes a handle portion, and the battery compartment is defined in the handle portion.

In some embodiments of the accessory, the accessory housing further comprises a grip portion formed on the handle portion of the accessory housing.

In one embodiment of the accessory, the light source includes a plurality of LED lights spaced around a circumference of the nose cap.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figure 1:
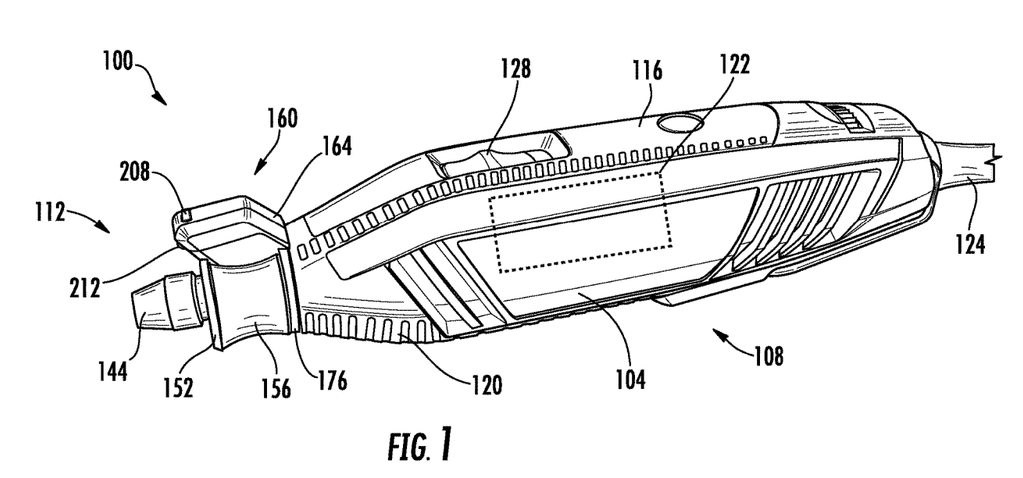
FIG. 1 is a side perspective view of a hand held rotary tool according to the disclosure.
Figure 2:
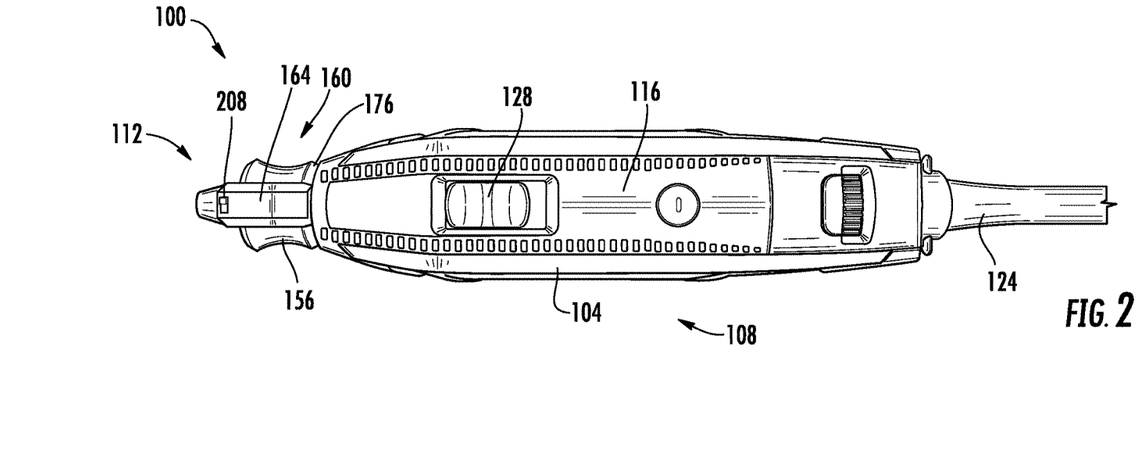
FIG. 2 is a top view of the rotary tool of FIG. 1.

FIGS. 1 and 2 illustrate a rotary tool 100 according to the present disclosure. The rotary tool includes a generally cylindrically shaped housing 104 constructed of a rigid material such as plastic, metal, or composite materials such as a fiber reinforced polymer. The housing 104 includes a main body portion 108 and a nose portion 112.

The main body portion 108 includes an upper grip 116 and a lower grip 120 to facilitate a user holding the tool 100. Additionally, the main body portion 108 encloses a motor 122. In one embodiment, the motor 122 comprises an electric motor configured to receive power from an AC outlet (not shown) via a power cord 124. Alternatively, electric power for the motor may be received from a rechargeable battery (not shown) connected at the base of the main body portion 108. As an alternative to electric power, the rotary tool 100 may be pneumatically or hydraulically powered. Power to the motor 122 is controlled by a motor power switch 128 provided adjacent the upper grip 116 of the main body portion 108.

Figure 3:
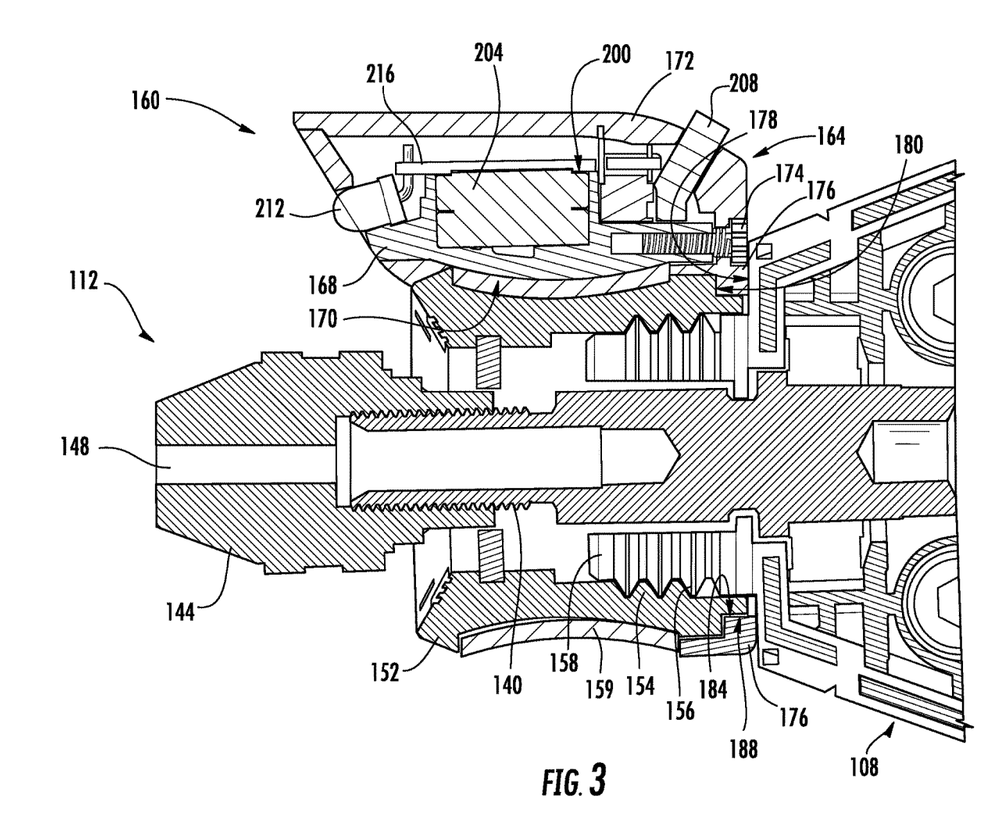
FIG. 3 is a side cross-sectional view of the nose portion of the rotary tool of FIG. 1

With reference to FIG. 3 and continued reference to FIGS. 1 and 2, a chuck 140 extends inside the housing 104 from the main body portion 108 into the nose portion 112. The chuck 140 is operably connected to an output shaft (not shown) of the motor 122 and is driven rotationally by the motor 122. The chuck 140 is attached to a tool holder 144, which includes an opening 148 in which an accessory tool (not shown) is held in place by a tool holding assembly (not shown) known in the art.

The nose portion 112 further includes a generally cylindrical nose cap 152 circumferentially surrounding the portion of the chuck 140 extending outside the main body portion 108 of the housing 104. The nose cap 152 includes a threaded portion 154 configured to interface with a threaded portion 156 of a projection 158 of the main body portion 108 that extends into the nose cap 152 to attach the nose cap 152 to the main body portion 108. The nose cap 152 is removable from the main body portion 108 by twisting the nose cap 152 relative to the main body portion 108. In some embodiments, the nose cap 152 includes a grip portion 159 formed of, for example, hard rubber to facilitate a user gripping the nose cap 152 to twist the nose cap 152.

The nose portion 112 also includes a lighting system 160 connected to the outside of the nose cap 152. The lighting system 160 has a light system housing 164 having a base portion 168 and a cover portion 172, which are connected to one another by, for example, a fastener 174. The base portion 168 includes a lower surface 170 that is complementary to the nose grip 159. In one embodiment, the lower surface 170 is separated from the nose grip 159 by a small distance of, for example, between 0.01 mm and 1 mm. In another embodiment, the lower surface 170 contacts the nose grip 159 and is slidable relative to the nose grip 159 to enable the lower surface 170 to rotate around the nose grip 159.

The cover portion 172 includes a mounting ring 176 integrally formed on the axial side of the cover portion 172 nearest the main body portion 108. In the illustrated embodiment, the mounting ring 176 is integrally formed with the cover portion 172, though in other embodiments the mounting ring 176 may be a separate component connected to the cover portion 172. Additionally, while the illustrated embodiment shows the mounting ring 176 as being part of the cover portion, in other embodiments, the mounting ring 176 is connected to or integral with the base portion 168.

When the nose cap 152 is attached to the main body portion 108 by threading the nose cap 152 onto the projection 158 of the main body portion 108, the mounting ring 176 is clamped between a bearing surface 178 of the main body portion 108 and a bearing surface 180 of the nose cap 152. As such, the mounting ring 176 is prevented from any movement relative to the nose portion 112 or the main body portion 108. As a result, the mounting ring 176 prevents movement of the lighting system 160 along the longitudinal axis of the tool.

Additionally, an inner circumferential surface 184 of the mounting ring 176 bears against an outer circumferential surface 188 of the nose cap 152. This contact prevents the mounting ring 176, and therefore the lighting system 160, from moving radially relative to the longitudinal axis of the rotary tool 100 when the nose cap 152 is not clamped tightly to the mounting ring 176. Furthermore, when the nose cap 152 is not clamped to the mounting ring 176, the inner circumferential surface 184 of the mounting ring 176 is configured to slide circumferentially around the outer surface 188 of the nose cap 152 to enable the mounting ring 176, and therefore the lighting system 160, to rotate around the nose cap 152.

The base portion 168 and the cover portion 172 of the light system housing 164 define a compartment 200 in which one or more batteries 204 are arranged. In some embodiments, the cover portion 172 of the lighting system housing 164 is connected to the base portion 168 by a snap fit or other manually removable connection to enable the user to remove the cover portion 172 to replace the batteries 204. In one embodiment, the lighting system 160 includes two 1.5 volt to provide 3 volts of total power. In other embodiments, other suitable batteries are used to provide the desired voltage.

The batteries 204 are operably connected to a light switch 208, which protrudes through the cover portion 172 to enable a user to manually activate and deactivate the lighting system 160. The light switch 208 is operably connected to a light 212, via, for example, a printed circuit board 216. The light 212 is oriented to direct light in the axial direction of the tool toward the working area when the light switch 208 is activated. When the light switch 208 is actuated to the "on" position, the batteries 204 are electrically connected to the light 212 via the PCB 216. In one embodiment, the light 212 is an LED light, though other desired lights may be used in alternative embodiments.

To use the rotary tool 100, the user attached the nose cap 152 to the main body portion 108 of the tool 100 by threading the threaded portion 154 of the nose cap 152 onto the threaded portion 156 of the projecting portion 158 of the main body portion 108. The user then rotates the lighting system 160 around the nose cap 152 to a position at which the light illuminates the working area without the lighting system housing 164 obstructing the user's view of the working area. The user then rotates the nose cap 152 relative to the main body portion 108 until the nose cap 152 clamps the mounting ring 176 tightly in position, thereby fixing the light housing 164 at the desired position.

The user then installs a desired attachment tool in the attachment system (not shown) by known methods. The user can then activate the light 212 by actuating the light switch 208, electrically connecting the light 212 to the batteries 204, resulting in the light 212 illuminating the work area. The user then actuates the motor power switch 128 to the "on" position to activate the motor and rotate the attachment tool, and the user performs the desired operations on the workpiece. Once complete, the user actuates the motor power switch 128 to the "off" position to deactivate the rotary tool 100 and actuates the light switch 208 to deactivate the light 212.

The lighting system 160 of FIGS. 1-3 advantageously enables the user to quickly and easily position the light 212 at a position that illuminates the working area and does not obstruct the user's view of the working area. Moreover, since the light 212 is powered by batteries 204 that are self-contained in the light system housing 164, no cumbersome wires are required between the lighting system 160 and the main body portion 108 of the tool, nor is a costly inductive power system required.

Figure 4:
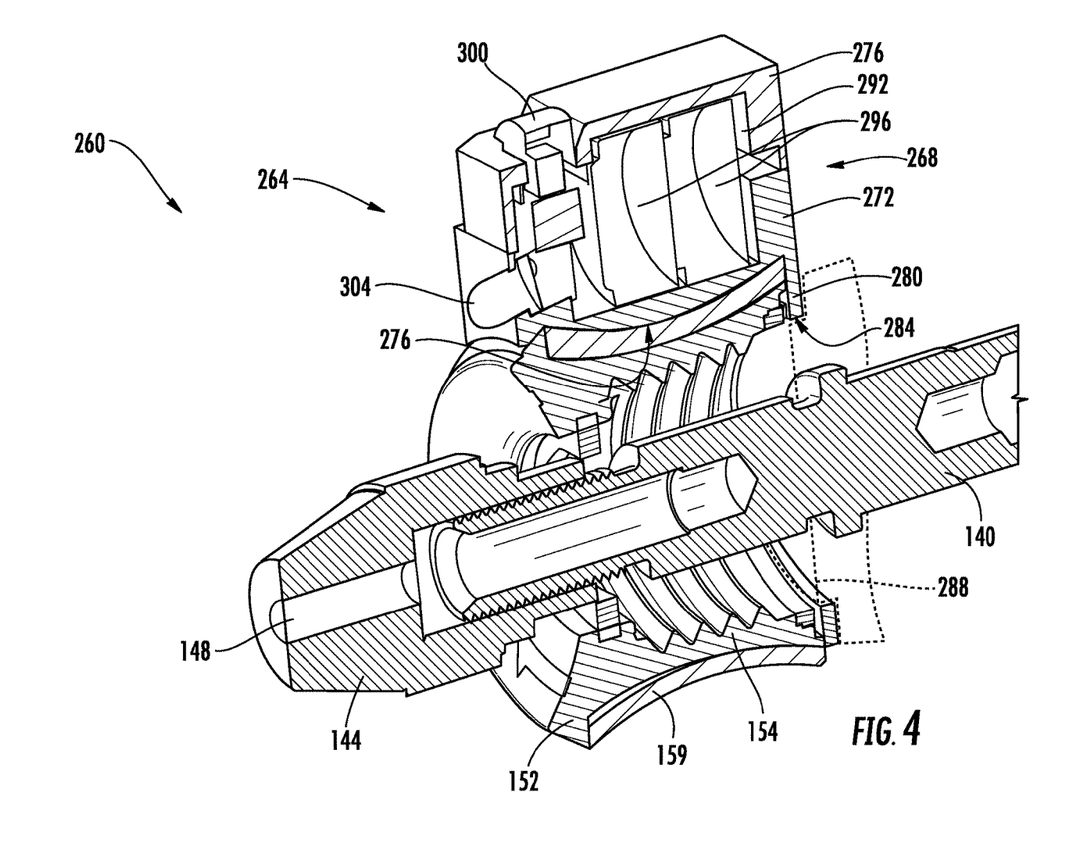
FIG. 4 is a partial cutaway of another embodiment of a nose portion for the rotary tool of FIG. 1.

FIG. 4 illustrates another embodiment of a nose portion 260, which can be used in the rotary tool 100 of FIG. 1 in place of the nose portion 112. The nose portion 260 includes a generally cylindrical nose cap 152 that is essentially identical to the nose cap described above.

The nose portion 260 also includes a lighting system 264 connected to the outside of the nose cap 260. The lighting system 264 has a light system housing 268 having a base portion 272 and a cover portion 276. The base portion 272 includes a lower surface 276 that is complementary to the nose grip 159 of the nose cap 152 and is slidable relative to the nose grip 159 to enable the lower surface 170 to rotate around the nose grip 159.

The base portion 272 includes a mounting ring 280 integrally formed on the axial side of the base portion 272 nearest the main body portion 108. The mounting ring 280 is positioned axially between the main body portion 108 and the nose cap 152 and is clamped between the main body portion 108 and the nose cap 152 in a manner similar to that discussed above with regard to the embodiment of FIGS. 1-3.

The mounting ring 280 further includes an inner circumferential surface 284 that bears against an outer circumferential surface of a projection 288 of the main body portion 108 that extends into the center opening of the mounting ring 280. This contact prevents the mounting ring 280, and therefore the lighting system 264, from moving radially relative to the longitudinal axis of the rotary tool 100. However, the inner circumferential surface 284 of the mounting ring 280 is configured to slide circumferentially around the outer surface of the projection 288 when the nose cap 152 is not clamped tightly to the main body portion 108 to enable the mounting ring 280, and therefore the lighting system 264, to rotate around the projection 288 and the nose cap 152.

The base portion 272 and the cover portion 276 of the light system housing 268 define a compartment 292 in which batteries 296 are arranged. The batteries 296 are operably connected to a light switch 300, which protrudes through the cover portion 276 to enable a user to manually activate and deactivate the lighting system 264. The light switch 300 is operably connected to a light 304, which is oriented to direct light in the axial direction of the tool toward the working area when the light switch 208 is activated. When the light switch 300 is actuated to the "on" position, the batteries 296 are electrically connected to the light 304.

Figure 5:
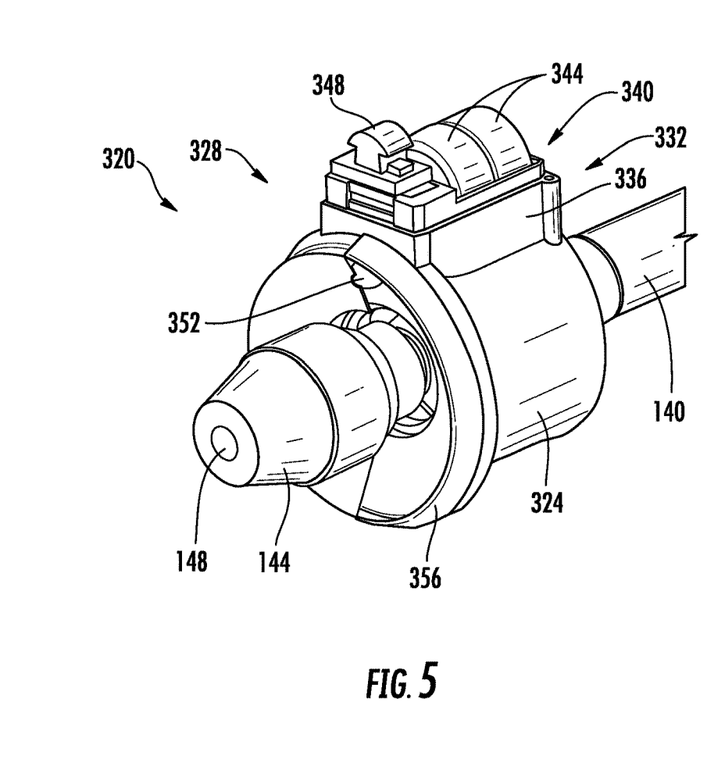
FIG. 5 is a perspective view of another embodiment of a nose portion for the rotary tool of FIG. 1.

FIG. 5 illustrates another embodiment of a nose portion 320, which can be used in place of the nose portion 112 of the rotary tool 100 of FIGS. 1-3. The nose portion 320 includes a nose cap 324, which is configured similarly to the nose cap 152, and a lighting system 328 fixedly connected to the nose cap 324. The lighting system 328 includes a lighting system housing 332 having a base portion 336 and a cover portion (not shown). The base portion 336 is integrally formed with the nose cap 324 and projects upwardly from the nose cap 324. The base portion 336 and the cover portion (not shown) define a battery compartment 340, in which batteries 344 are arranged.

The batteries 344 are operably connected to a light switch 348 and a light 352 in a similar manner as described above with regard to the embodiment of FIG. 4. In the embodiment of FIG. 5, in contrast to the embodiment of FIG. 4, the light 352 protrudes through a front cover 356 of the nose cap 324.

Figure 6:
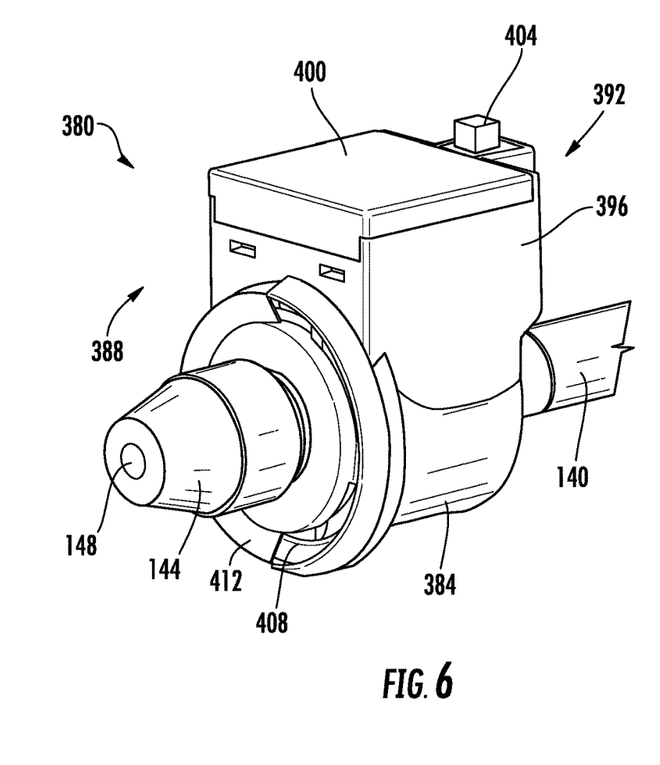
FIG. 6 is a perspective view of yet another embodiment of a nose portion for the rotary tool of FIG. 1.

FIG. 6 illustrates another embodiment of a nose portion 380, which can be used in place of the nose portion 112 of the rotary tool 100 of FIGS. 1-3. The nose portion 380 includes a nose cap 384, which is configured similarly to the nose cap 152 of FIG. 3, and a lighting system 388. The lighting system 388 includes a lighting system housing 392 having a base portion 396 and a cover portion 400 defining a battery compartment (not shown) in which one or more batteries (not shown) are arranged. A light switch 404 is positioned on the top of the lighting system housing 392 and is configured to activate and deactivate the lighting system 388.

In contrast the embodiments of FIGS. 3-5, the lighting system 388 includes a light ring 408 configured to project light through openings in the front cover 412 of the nose cap 384. The light ring 408 extends around at least a portion of a circumference of the nose cap 384. In one embodiment, the light ring 408 extends around the entire circumference of the nose cap 384. In one particular embodiment, the light ring 408 is formed of a plurality of LED elements, though in other embodiments another desired light ring is used.

Figure 7:
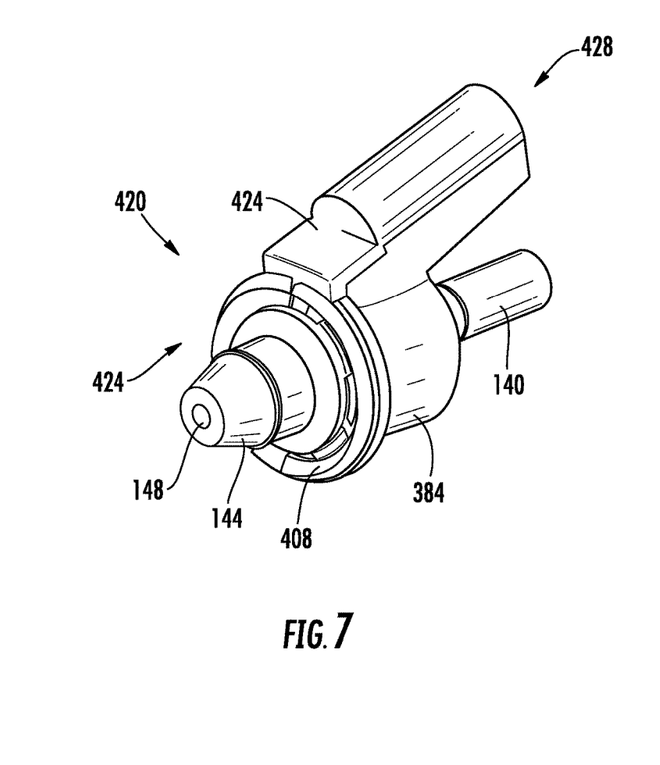
FIG. 7 is a perspective view of a further embodiment of a nose portion for the rotary tool of FIG. 1.
Figure 8:
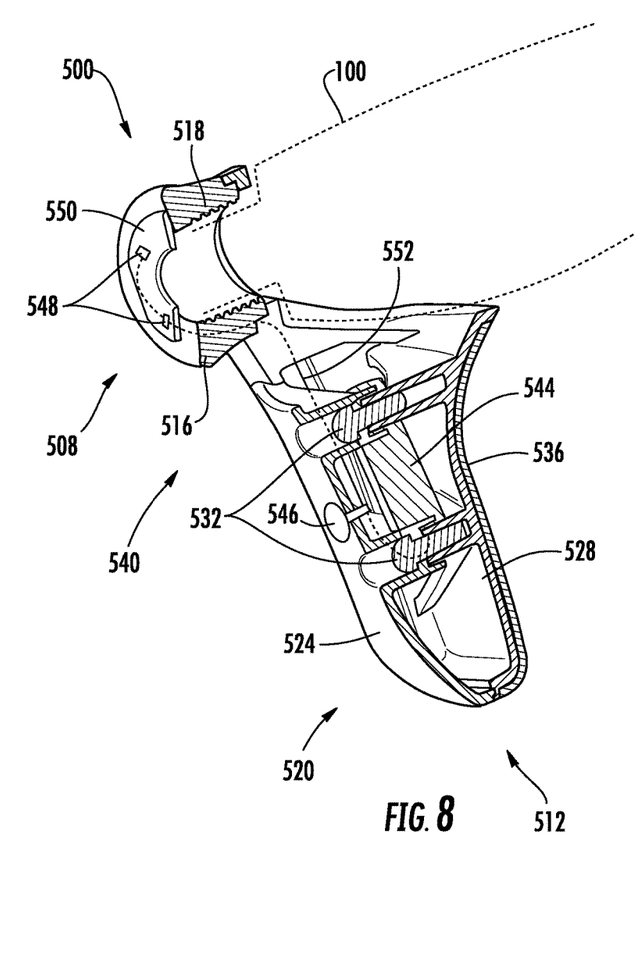
FIG. 8 is a cross-sectional view of a detailer grip attachment for the rotary tool of FIG. 1.
Figure 9:
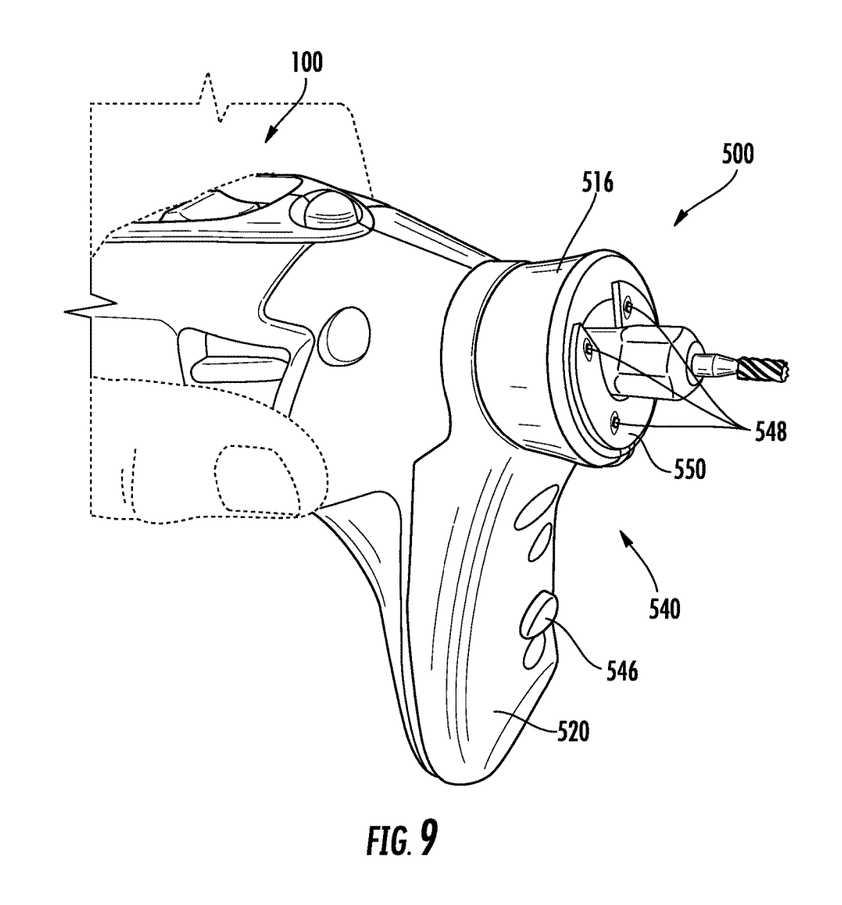
FIG. 9 is a side perspective view of the detailer grip attachment of FIG. 8 attached to the rotary tool.
Figure 10:
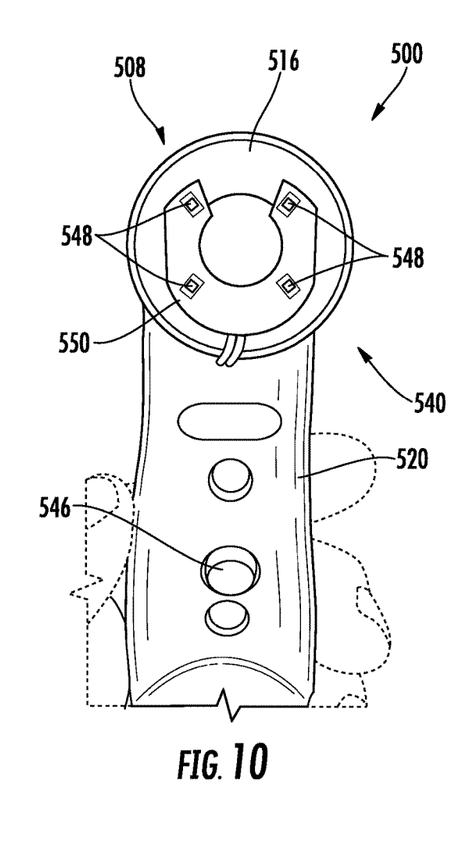
FIG. 10 is a front view of the detailer grip attachment of FIG. 8.
Figure 11:
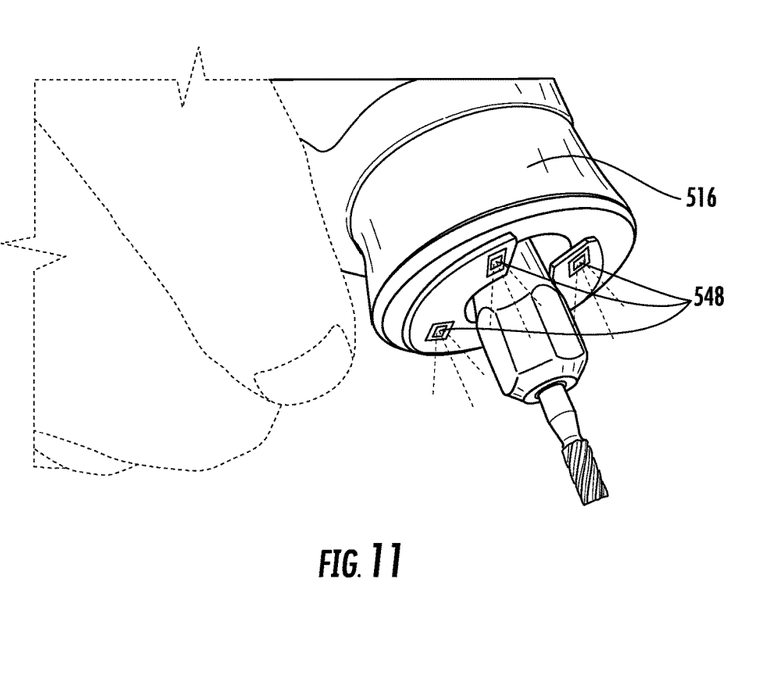
FIG. 11 is a perspective view of the detailer grip attachment of FIG. 8.

FIG. 7 illustrates yet another embodiment of a nose portion 420 that is substantially identical to the nose portion 380 of the embodiment of FIG. 6. However, the nose portion 420 includes a lighting system 424 having a battery housing 428 with a partially cylindrical shape. The battery housing 428 may be configured to accommodate a type GP-23 12 volt battery or a conventional "AA" or "AAA" type battery to power the light ring 408.

FIGS. 8-11 illustrate a detailer attachment 500 for the rotary tool 100 of FIGS. 1 and 2. The detailer attachment 500 is configured to be removably attachable to the rotary tool 100. The detailer attachment 500 includes a nose portion 508, which replaces the nose portion 112 of the rotary tool 100 when installed, and a handle portion 512. The nose portion 508 includes a nose cap 516, which includes a threaded portion 518 configured to interface with the threaded portion 156 of the projection 158 of the rotary tool 100 extending into the nose cap 516 in a manner similar to the interface discussed above between the nose cap 152 and the projection 156.

The handle portion 512 includes a detailer housing 520 composed of a first housing part 524 and a second housing part 528 connected to one another via fasteners 532. The second housing part 528 includes a grip region 536 configured to facilitate the user holding the detailer attachment 500 and enabling the user to more accurately control the rotary tool 100 during machining operations.

The detailer attachment 500 further includes a lighting system 540. The lighting system 540 includes a battery 544 arranged in a compartment of the detailer housing 520, a light switch 546 positioned on the detailer housing 520, and lights 548 arranged on the nose cap 516. In one embodiment, the battery 544 is a type GP-23, MN21, or similar 12 volt battery. In some embodiments, the lighting system 540 includes a printed circuit board 550 that has four LED lights 548 spaced approximately equally around the nose cap 516. In other embodiments, any desired number or type of lights may be used with the lighting system.

The battery 544 is connected to the switch 546 and the lights 548 via a wired connection 552 that extends through the detailer housing 520 and nose cap 516 from the battery 544 to the switch 546 and to the lights 548. In one embodiment, the switch 546 is configured as a push-button which is activated to enable an electrical connection between the battery 544 and the lights 548 only when the switch 546 is depressed. In other embodiments, the switch 546 may be configured as an on-off switch that is actuated to activate the lights 548 on and actuated again to deactivate the lights 548.

The detailer grip accessory 500 enables a user to grip the rotary tool 100 better and more precisely align the tool with the workpiece. Additionally, the detailer housing provides ample volume in which to accommodate one or more batteries 544 for the lighting system 540. As a result, the lighting system 520 can include higher capacity or higher voltage batteries than in conventional lighting systems, thereby enabling the lighting system 540 to include additional lights 548 and provide better lighting of the work area.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A rotary power tool comprising:
a tool housing comprising a main body portion and a nose portion including a nose cap; and
a lighting system comprising:
a lighting system housing mounted on the tool housing and defining a battery compartment;
a light source; and
at least one battery disposed in the battery compartment, the at least one battery being operably connected to the light source to supply electrical current to the light source,
wherein:
the lighting system includes a mounting portion that is clamped by and between the nose cap and the main body portion of the tool housing;
the nose cap includes an outer surface; and
the lighting system housing includes a lower surface that is complementary to a portion of the outer surface, the lower surface being configured to slide along the outer surface.

2. The rotary power tool of claim 1, wherein the light source is supported by the lighting system housing, and the lighting system housing is rotatably supported on the tool housing so as to be rotatable around the nose cap.

3. The rotary power tool of claim 2, wherein the mounting portion of the lighting system housing includes a mounting ring circumferentially surrounding a portion of the tool housing and configured to mount the lighting system on the tool housing.

4. The rotary power tool of claim 3, wherein the nose cap includes a first threaded region configured to mount the nose cap on a second threaded region of the main body portion, the mounting ring being arranged between the nose cap and the main body portion so that the nose cap clamps the mounting ring in a fixed position when the nose cap is tightened onto the main body portion.

5. The rotary power tool of claim 4, wherein the mounting ring is rotatable around the nose cap when the nose cap is not tightened to the main body portion.

6. The rotary power tool of claim 1, wherein the lighting system further comprises a light power switch operably connected to the light source and to the at least one battery, the light power switch being configured to open and close an electrical connection between the light source and the at least one battery.

7. The rotary power tool of claim 1, wherein the lighting system housing is supported by and fixed to the nose cap.

8. The rotary power tool of claim 7, wherein the nose cap includes a front cover defining an opening, and the light source is configured to emit light through the opening.

9. The rotary power tool of claim 1, wherein the light source includes an LED (light emitting diode) light.

10. The rotary power tool of claim 1, wherein the light source includes an LED (light emitting diode) light ring arranged around at least a portion of a circumference of the nose cap.

11. The rotary power tool of claim 1, further comprising a motor arranged in the main body portion of the housing.

12. The rotary power tool of claim 11, further comprising:
a tool holder operably connected to an output shaft of the motor such that the output shaft of the motor rotationally drives the tool holder,
wherein the light source is configured to emit light in a direction toward the tool holder.

13. The rotary power tool of claim 1, wherein the at least one battery includes a 12 volt battery.

14. The rotary power tool of claim 1, wherein the lower surface and the portion of the outer surface to which the lower surface is complementary are spaced apart by a distance of between 0.01 mm and 1 mm.

15. The rotary power tool of claim 1, wherein the lower surface contacts the portion of the outer surface to which the lower surface is complementary.

16. A lighting system for a rotary power tool, comprising:
a lighting system housing including a mounting ring configured to circumferentially surround a portion of a tool housing of the rotary power tool between a nose cap and a main body portion of the rotary power tool to rotatably mount the lighting system housing on the rotary power tool, the mounting ring configured to be clamped by and between the nose cap and the main body portion, and the lighting system defining a battery compartment;
a light source supported by the lighting system housing; and
at least one battery disposed in the battery compartment, the at least one battery being operably connected to the light source to supply electrical current to the light source,
wherein the lighting system housing includes a lower surface that is complementary to a portion of an outer surface of the nose cap, the lower surface being configured to slide along the outer surface.

* * * * *